(12) United States Patent
Wyse

(10) Patent No.: US 6,210,090 B1
(45) Date of Patent: Apr. 3, 2001

(54) ADJUSTABLE LOAD BAR

(76) Inventor: Gene Wyse, 10510-County Rd. 12, Wauseon, OH (US) 43567

( * ) Notice: Subject to any disclaimer, the term of this patent is extended or adjusted under 35 U.S.C. 154(b) by 0 days.

(21) Appl. No.: 09/564,844

(22) Filed: May 4, 2000

(51) Int. Cl.[7] .................................................. B60P 7/15
(52) U.S. Cl. ........................ 410/151; 410/122; 410/143
(58) Field of Search .................... 410/122, 143, 410/145, 151; 248/354.5, 354.6, 354.7; 211/105.3; 254/12, 95, 108, 247; 74/141.5, 143, 167

(56) References Cited

U.S. PATENT DOCUMENTS

| | | | |
|---|---|---|---|
| 3,049,328 | * 8/1962 | Bishop | 410/151 |
| 3,110,506 | * 11/1963 | O'Brien | 410/151 |
| 4,781,499 | * 11/1988 | Wisecarver | 410/151 |
| 5,378,095 | * 1/1995 | Shultz | 410/151 |
| 5,443,342 | * 8/1995 | Huang | 410/143 X |
| 5,833,414 | * 11/1998 | Feldman et al. | 410/151 |
| 5,890,856 | * 4/1999 | Huang | 410/151 |
| 5,947,666 | * 9/1999 | Huang | 410/143 X |
| 5,988,963 | * 11/1999 | Shiau | 410/143 X |

* cited by examiner

Primary Examiner—Stephen T. Gordon
(74) Attorney, Agent, or Firm—Marshall & Melhorn, LLC

(57) ABSTRACT

An improved load securing bar for the transport industry includes telescoping tubes, the position of which can be adjusted relative to each other to control the length of the load securing bar for different size environments and different loads. The load securing bar preferably includes both a rough adjustment mechanism for relatively long length adjustments and a fine adjustment mechanism for more precise length adjustments. The fine adjustment mechanism includes a gear and rack assembly which are housed within the telescoping tubes.

18 Claims, 2 Drawing Sheets

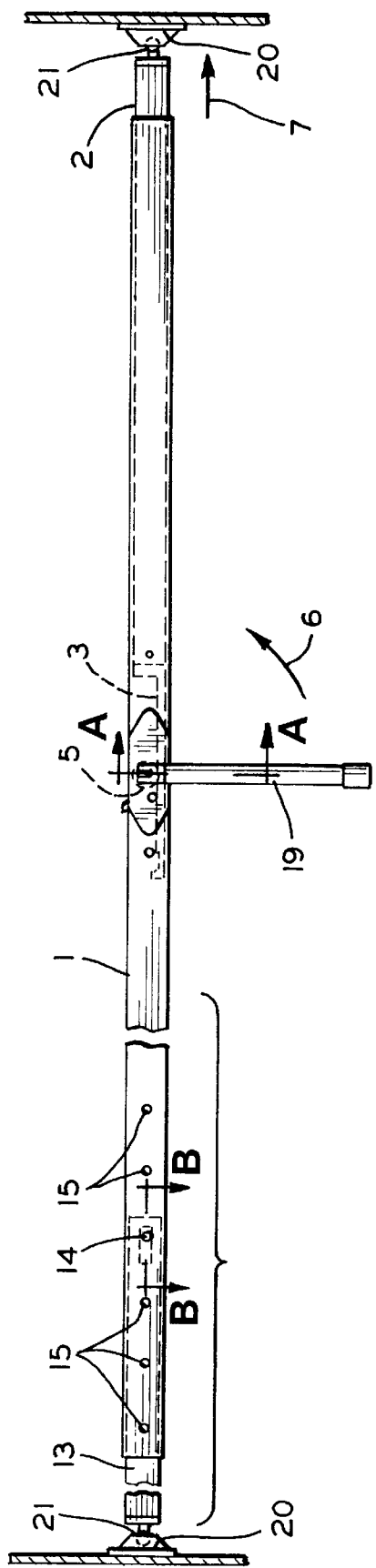
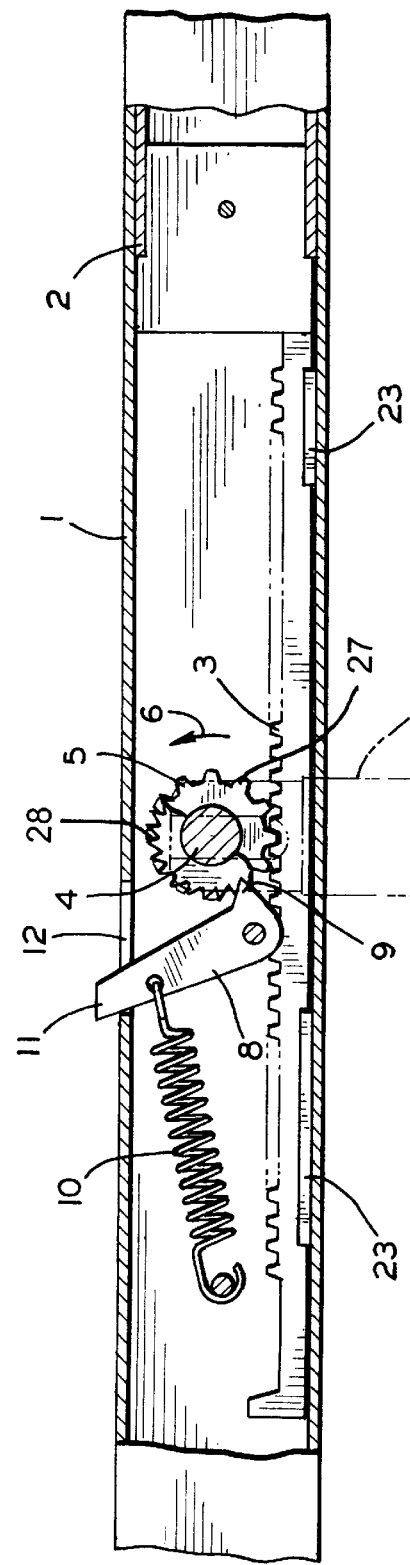

US 6,210,090 B1

ADJUSTABLE LOAD BAR

BACKGROUND OF THE INVENTION

1. Field of the Invention

The present invention relates to retaining devices to prevent the shifting of loads within an enclosed space, and more particularly, to an improved load retaining device for vehicles, particularly trucks, to prevent shifting of the load of the truck while in transit.

2. Summary of Related Art

Cargo within trucks, unless it substantially fills the available space, tends to shift position during transit, in response to acceleration, deceleration and/or bumps or other vibrations. Typically during loading, trucks are not totally filled, thus resulting in the shifting problem. While mechanisms such as cargo webs are available for retaining cargo, such webs are unwieldy and are especially unsuitable for situations where frequent loading and unloading occur.

One type of extendable bracing bar is a hydraulic bracing bar. Hydraulic bracing bars have proven to be unsuitable for most applications due to occurrence of leakage and poor performance in cold temperatures.

Extendable bracing bars are well known in the art of load bracing in the trucking industry. Many of these bars provide for a large imprecise adjustment of the bar length and then a shorter, more precise adjustment to optimize the bar length for the retaining purposes. An example of such a bar is found in U.S. Pat. No. 5,378,095, which describes a load securing device for holding cargo within trucks against shifting during motion of the truck. The bar of U.S. Pat. No. 5,378,095 provides a gross adjustment and a final adjustment via a pinion gear engaged with a rack. The final adjustment structure does not utilize springs so as to increase the durability of the device. This bracing bar has not found its way into commercial use.

A disadvantage of this bracing bar is that the final adjusting mechanism is exposed to the environment. As such, the mechanism is vulnerable to damage from accidental contact or through added exposure to contaminants during normal usage. Additionally, there can be danger to the user or to the cargo from the exposed adjusting mechanism. It would be preferable to minimize the possibility of damage to this mechanism.

Therefore, it is an object of the present invention to provide an improved load securing device.

It is a further object of the present invention to provide a load securing device which minimizes the possibility of damage or undue wear to the fine adjustment mechanism.

Yet another object of the invention is to provide a load securing bar where the operator and the load are not exposed to the mechanism of the gear and rack.

SUMMARY OF THE INVENTION

In accordance with the present invention, there is provided a load securing bar, including telescoping tubes, with structure for both rough adjustments and more precise adjustments, wherein most of the structure for the more precise adjustments is contained inside the hollow main tube. Specifically, the gear and rack are both within tubes. Preferably, the load bar is designed with the structure for rough adjustment at one end and the structure for precise adjustment at the other. In this manner, the structure is not exposed to excessive wear and thus can result in an increased service life of the bar. In a typical application, a vehicle may use about ten load bars to adequately restrain the cargo.

The ends of the bar of the invention may be equipped with structure for bracing the bar in the vehicle, preferably pivotable feet or pads. The bar can preferably include a main tube and second and third tubes axially displacable within the main tube. The fine adjustment mechanism can make fine adjustments of the position of the second tube with respect to the main tube and the rough adjustment mechanism can adjust the position of the third tube with respect to the main tube.

BRIEF DESCRIPTION OF THE DRAWINGS

The above, as well as other advantages of the present invention, will become readily apparent to those skilled in the art from the following detailed description when considered in light of the accompanying drawings in which:

FIG. 1 shows a profile view of a load bar according to the present invention;

FIG. 2 shows an expanded cut away view of the load bar of FIG. 1 showing the internal mechanism;

DETAILED DESCRIPTION OF THE PREFERRED EMBODIMENT

Figure 3:
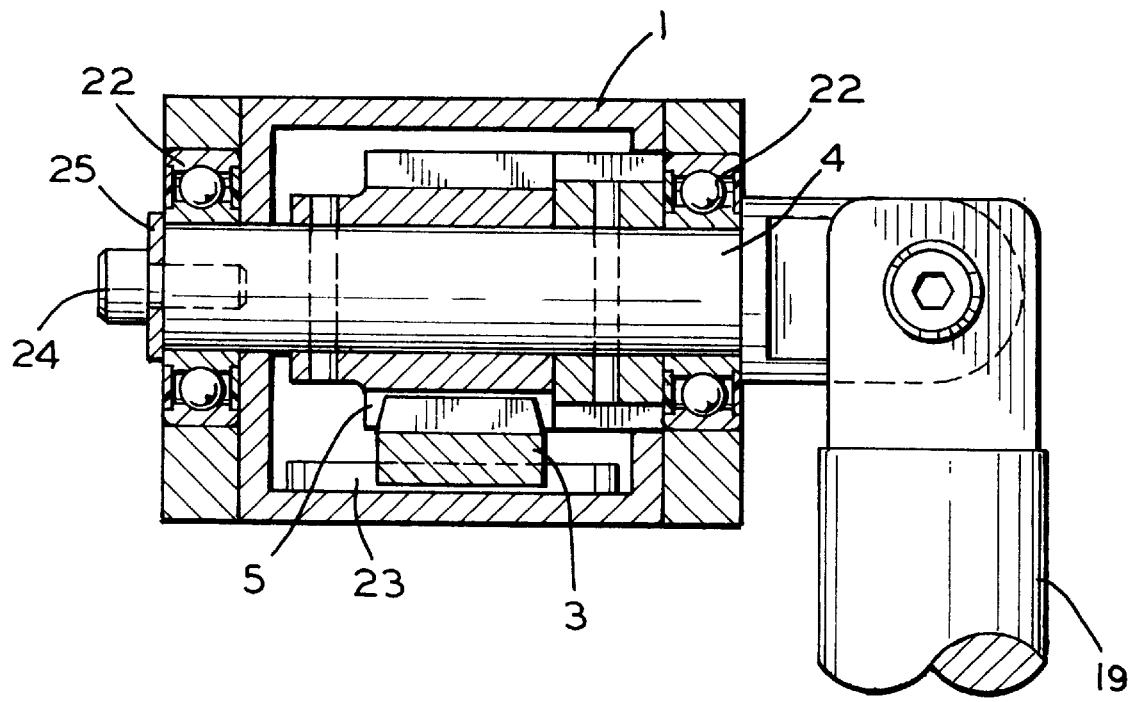
FIG. 3 shows a cross section of section A—A in FIG. 1.

Referring now to the drawings, FIGS. 1 and 2 illustrate a load bar in accordance with the present invention, including a main tube 1. A second tube 2 is positioned to slide in the main tube 1. In a preferred embodiment of the present invention the main tube 1 is substantially hollow, although other embodiments of this main tube may be possible, wherein parts of the main tube are not hollow. A toothed track or rack 3 is connected to the second tube 2 and is positioned to slide along the inner surface of the main tube 1 along with the second tube 2. Preferably, the toothed track 3 can be pinned to the second tube 2, as best seen in FIG. 2. An axle 4 for a gear 5 is rotatably fixed in the main tube 1. The gear is preferably designed with a first set of teeth 27 and a second set of teeth 28. The second set of teeth 28 of the gear 5 are preferably at a sharper angle than the first set of teeth 27 and are adapted to cooperate with a pawl 8. The first set of teeth 27 of the gear 5 are designed to mesh with the teeth of the toothed track 3 to displace the toothed track 3, along with the second tube 2, relative to the main tube 1 upon rotation of the gear 5 in the direction of rotation 6. This rotation then displaces the second tube 2 in the direction 7. To minimize wear of toothed track 3 and the main tube 1 when the toothed track 3 is sliding with respect to the main tube 1, at least one low friction pad 23 can be positioned on the toothed track 3 to slide along the inside of the main tube 1. This low friction pad 23 can thus substantially prevent direct contact of the toothed track 3 with the interior of the main tube 1. Preferably, a pair of spaced apart pads 23 are used.

In a preferred embodiment of the present invention, the main tube 1 has a substantially square or rectangular cross section. Preferably, the at least one low friction pad 23 can be made of durable, low friction plastic, and the toothed track 3 can preferably be made of anodized aluminum. In at least one preferred embodiment of the present invention, the sizes and teeth ratio of the first set of teeth 27 of the gear 5 and the toothed track 3 can be designed so that one complete rotation of the handle 19 and gear 5 results in a displacement of the second tube 2 with respect to the main tube 1 of about three inches.

The load bar also includes a mechanism to allow rotation of the gear 5 to extend the second tube 2 with respect to the main tube 1, but to prevent rotation of the gear 5 in the direction opposite the direction of rotation 6. In the embodiment shown, the pawl 8 is positioned so that a tooth 9 of the pawl 8 selectively engages the second set of teeth 28 of the gear 5. A spring 10 tensions the pawl 8 to intermesh the tooth 9 with the second set of teeth 28 of the gear 5. The interaction of the second set of teeth 28 of the gear 5 with the tooth 9 of the pawl 8 allows the gear 5 to rotate by a ratcheting action in the direction of rotation 6, but prevents rotation in the opposite direction. An end 11 of the pawl 8 extends through a slot 12 in the main tube 1. By displacing the end 11 of the pawl 8, the tooth 9 can be disengaged from the gear 5, allowing the second tube 2 to move opposite the direction 7. In the embodiment shown, the end 11 of the pawl 8 can be displaced by hand, although other mechanisms for displacing the end 11 are possible within the scope of the present invention. Similarly, the illustrated embodiment shows a tension spring 10 tensioning the pawl 8. Other embodiments of this mechanism are possible within the scope of the present invention. For example, a V or L shaped plate spring can be designed in such a manner as to tension the pawl 8 with respect to the gear 5. For example, the pawl 8 could be positioned to engage the gear 5 from the opposite side from what is shown herein. In this case, the V or L shaped spring could engage the end 11 of the pawl 8 and push it away from the outside of the main tube 1 which, in the example described, would engage the tooth 9 of the pawl 8 with the gear 5. In the embodiment described, the pawl 8 could release the gear 5 by pressing the end 11 of the pawl 8 toward the main tube 1. Other constructs of this mechanism are also possible within the scope of the present invention.

In the preferred embodiment illustrated in FIG. 1, a third tube 13 is provided which is a part of the rough adjustment structure. A pin 14 is operatively connected to the third tube 13, and engages with one of a series of holes 15 in the main tube 1. The series of holes 15 are axially displaced from one another to allow a displacement of the third tube 13 with respect to the main tube 1. The third tube 13 thus telescopes within the end of the main tube 1 opposite the second tube 2. This allows the load bar to be easily extended to a rough distance before the fine adjusting mechanism is utilized to insure the load is adequately supported.

Figure 4:
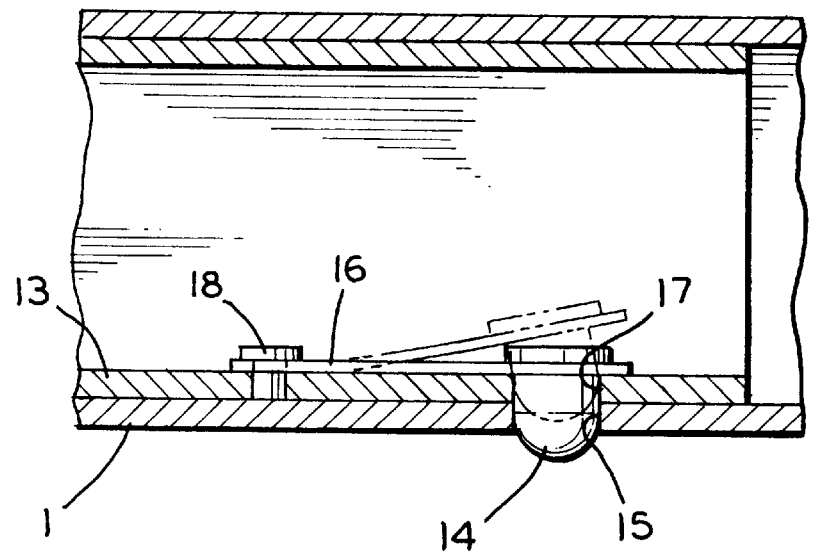
FIG. 4 shows a cross section of section B—B in FIG. 1.

FIG. 4 illustrates a detail view of the rough adjustment mechanism. The pin 14 is attached to an end of a plate spring 16 which is positioned inside the third tube 13, and extends through a hole 17 in the wall of the third tube 13. The opposite end of the plate spring 16 is secured to the inside of the third tube 13. In the embodiment shown, the plate spring 16 is held by a rivet 18, but other conventional methods of fastening, such as welding, are possible in conjunction with embodiments of the present invention. By the mechanism shown, the pin 14 can be displaced from the hole 15 in the main tube 1 in which it is engaged, and then the third tube 13 can be moved to align with a different one of the plurality of holes 15. This allows a rough adjustment of the length of the load bar.

FIG. 1 also shows a handle 19 which is secured to the axle 4 and the gear 5. This handle 19 can be used to adjust the fine position of the load bar by turning the gear 5 in the direction of rotation 6 to displace the second tube 2 in the direction 7. The pawl 8 prevents the gear 5 from turning opposite the direction of rotation 6. The connection of the handle 19 to the gear 5 can be a simple connection which always rotates with the gear 5, or the connection can be designed so that it does not rotate with the gear 5 when the gear 5 is allowed to rotate opposite the direction of rotation 6. This choice may be preferred for safety when disengaging the load bar.

FIG. 1 also illustrates 2 optional foot members or pads 20 disposed at opposite ends of the load bar. As shown, one foot member 20 is connected to the second tube 2 and the other foot member 20 is connected to the third tube 13. Preferably, the foot members 20 are connected by a ball joint 21 to their respective tubes (2, 13), which allows the foot members 20 to pivot with respect to the tubes. This can help to insure a secure positioning of the load bar even when the opposing surfaces it is positioned between are not perfectly parallel to each other. If a load bar according to the present invention was constructed without the rough adjustment mechanism and the third tube 13, the pads 20 could be placed on an end of the second tube 2 and the end of the main tube 1 opposing the second tube 2.

FIG. 3 illustrates a cross section of the main tube 1 at the gear 5. In a preferred embodiment, the axle 4 can be held in position by bearings 22 mounted in apertures in the main tube 1, preferably sealed roller bearings, to securely hold the gear 5 in the main tube 1, while allowing rotation of the gear 5. Preferably the end of the axle 4 of the gear 5 can be secured with a screw 24 and washer 25 combination. FIG. 3 also illustrates a pair of pins 26, which secure the gear 5 to the axle 4.

Use of the invention, as described above, can be carried out as follows. The rough adjustment mechanism can simply be used by depressing the pin 14 through the hole 15 in main tube 1. The third tube 13 can then be moved to the appropriate position so that the pin 14 can extend through a different one of the holes 15. This allows rough adjustment of the length of the load bar in discreet increments. The fine adjustment mechanism can then be used to make precise adjustments of the length to the desired length. By turning the handle 19 the gear 5 rotates and the pawl 8 disengages from the tooth of the gear 5 with which it is engaged and engages with the next tooth, displacing the second tube 2 with respect to the main tube 1, thus increasing the length of the load bar. This continues as the handle 19 is being turned. When the desired length is reached, the tooth 9 of the pawl 8 engages the gear 5 to hold the bar at that length. To remove the bar, the release of the pawl 8 is engaged. In the illustrated embodiment, the end 11 of the pawl 8 projecting through the slot 12 in the main tube 1 is depressed, against the force of the spring 10, which releases the tooth 9 of the pawl 8 from the teeth of the gear 5. This allows the gear 5 to rotate opposite the direction of rotation 6, decreasing the length of the load bar. The rough adjustment mechanism can be shortened in the same manner that it is lengthened, by depressing the pin 14, and manually adjusting the relative positions of the main tube 1 and the third tube 13.

The inventive load bar described thus has a simple and efficient operation, and is improvement over known load bars. By locating of the gear and rack assemblies inside the tubes, the present invention makes a more compact load bar and insures that there are no exposed gears. Thus the mechanism is protected from undue wear, and also users and cargo of the vehicle are not exposed to the gear mechanism.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A load securing device for holding cargo within a truck from shifting of the cargo within the truck, said load securing device comprising:
   a hollow main tube;
   a second tube slidably received within said hollow main tube for axial movement within said hollow main tube;
   a toothed track disposed within said hollow main tube and connected to and configured to move axially with said second tube;
   an axle rotatably secured to said main tube and a gear disposed about said axle for rotation therewith, said gear being disposed within said hollow main tube and having teeth configured to engage said toothed track, so that said toothed track is displaced axially within said hollow main tube upon rotation of said gear in a direction of rotation;
   a pawl secured to said main tube and disposed to engage the teeth of said gear to prevent said gear from being rotated opposite said direction of rotation; and
   a handle secured to said axle for rotating said axle and said gear.

2. The load securing device of claim 1 further comprising a third tube disposed within said main tube, said third tube being axially displacable at set intervals within said main tube, and a foot member for engaging a surface disposed at each end of said device.

3. The load securing device of claim 2 further comprising a pin assembly to position and secure said third tube with respect to said second tube, said pin assembly including
   a pin operatively connected to said third tube and disposed to project outwardly from there; and a plurality of holes formed in said main tube and disposed at axial intervals from one another to receive said pin.

4. The load securing device of claim 3 wherein:
   said third tube comprises a hole therethrough and said pin is disposed through said hole in said third tube;
   said pin assembly comprises a plate spring disposed within said third tube with said pin being disposed on said plate spring; and
   said plate spring is disposed and configured to releasably hold said pin in said hole in said third tube and in a selected one of said holes in said main tube.

5. The load securing device of claim 2 wherein said third tube is connected by a ball joint to a pivotable pad of one of said foot members, said pivotable pad being configured to be disposed against one of a wall of the truck or the cargo of the truck.

6. The load securing device of claim 2 wherein said second tube is connected by a ball joint to a pivotable pad of one of said foot members, said pivotable pad being configured to be disposed against one of a wall of the truck or the cargo of the truck.

7. The load securing device of claim 1 wherein said main tube has a square cross section.

8. The load securing device of claim 1 further comprising at least one low friction pad connected to said toothed track to axially slide along a surface of said main tube upon displacement of said toothed track within said main tube.

9. The load securing device of claim 8 wherein said at least one low friction pad is made of plastic.

10. The load securing device of claim 1, wherein one complete revolution of said handle displaces said second tube about three inches with respect to said main tube.

11. The load securing device of claim 1 wherein said main tube comprises a slot, a portion of said pawl being disposed to project through said slot.

12. The load securing device of claim 11 wherein said portion of said pawl is manually operable to release said pawl from said gear to allow said gear to rotate opposite said direction of rotation.

13. The load securing device of claim 12 further comprising a spring having a first end connected to said main tube and a second end connected to said pawl, said spring urging said pawl into engagement with said gear to prevent said gear from rotating opposite said direction of rotation unless said pawl is manually released.

14. The load securing device of claim 13 wherein said spring is a tension spring disposed within said main tube.

15. The load securing device of claim 1 wherein said toothed track is formed of anodized aluminum.

16. The load securing device of claim 1 further comprising at least two bearing members mounted to said main tube and rotatably supporting said axle with respect to said main tube, at least one of said at least two bearing members being disposed on each side of said gear.

17. A load securing device according to claim 1, wherein:
   said teeth of said gear comprise a first set of gear teeth and a second set of gear teeth;
   wherein said second set of gear teeth form a more acute angle to said gear than said first set of gear teeth;
   said toothed track is configured to engage said first set of gear teeth to displace said second tube axially within said hollow main tube; and
   said pawl is configured to engage said second set of gear teeth to prevent said gear from being rotated opposite said direction of rotation.

18. A load securing device for holding cargo within a truck from shifting of the cargo within the truck, said load securing device comprising:
   a hollow main tube;
   a second tube slidably received within said hollow main tube for axial movement within said hollow main tube;
   a toothed track disposed within said hollow main tube and connected to and configured to move axially with said second tube;
   an axle rotatably secured to said main tube and a gear disposed about said axle for rotation therewith, said gear being disposed within said hollow main tube and having teeth configured to engage said toothed track, so that said toothed track is displaced axially within said hollow main tube upon rotation of said gear in a direction of rotation;
   a pawl secured to said main tube and disposed to engage the teeth of said gear to prevent said gear from being rotated opposite said direction of rotation;
   a handle secured to said axle for rotating said axle and said gear;
   a third tube disposed within said main tube, said third tube being axially displacable at set intervals within said main tube; and
   two foot members for engaging a surface, one of said two foot members being disposed at each end of said device.

* * * * *